US00RE45951E

(19) United States
(12) Reissued Patent
Mullaney et al.

(10) Patent Number: US RE45,951 E
(45) Date of Reissued Patent: Mar. 29, 2016

(54) CABLE ENCLOSURE ASSEMBLIES AND METHODS FOR USING THE SAME

(75) Inventors: Julian S. Mullaney, Raleigh, NC (US); James Bert Powell, Garner, NC (US); William Alan Carrico, Raleigh, NC (US); Christopher Alan Hastings, Raleigh, NC (US)

(73) Assignee: CommScope Technologies LLC, Hickory, NC (US)

(21) Appl. No.: 13/272,849

(22) Filed: Oct. 13, 2011

Related U.S. Patent Documents

Reissue of:
(64) Patent No.: 7,603,018
Issued: Oct. 13, 2009
Appl. No.: 11/980,284
Filed: Oct. 30, 2007

U.S. Applications:
(60) Provisional application No. 60/885,081, filed on Jan. 16, 2007.

(51) Int. Cl.
*G02B 6/44* (2006.01)

(52) U.S. Cl.
CPC ..... *G02B 6/4471* (2013.01); *G02B 6/4477* (2013.01)

(58) Field of Classification Search
USPC ..... 386/136
See application file for complete search history.

(56) References Cited

U.S. PATENT DOCUMENTS 4,849,580 A 7/1989 Reuter
4,954,098 A 9/1990 Hollingsworth et al.
4,986,625 A * 1/1991 Yamada et al. ..... 385/55
5,030,136 A 7/1991 Reinhardt et al.
5,044,719 A * 9/1991 Nakamura ..... 385/76
5,347,084 A 9/1994 Roney et al.
5,397,859 A 3/1995 Robertson et al.
5,410,105 A 4/1995 Tahara et al.

(Continued)

FOREIGN PATENT DOCUMENTS

DE 296 05 927 8/1996
EP 1907897 B1 9/2008

(Continued)

OTHER PUBLICATIONS

Tyco Electronics Corporation, FOSC 450, Fiber Optic Gel Splice Closures, 2001, 2 Pages.

(Continued)

*Primary Examiner* — Michelle R Connelly
(74) *Attorney, Agent, or Firm* — Merchant & Gould P.C.

(57) ABSTRACT

A cable enclosure for use with a cable having a lengthwise cable axis, an outer jacket and a transmission media within the outer jacket, includes a housing assembly and a strain relief structure on the housing assembly. The housing assembly defines a chamber and a cable port. The housing assembly is configured to receive the cable. The strain relief structure includes a pair of opposed engagement structures defining a cable slot therebetween. At least one of the engagement structures includes a blade edge flanking the cable slot. The cable enclosure is configured to receive the cable such that the cable extends through the cable port and into the chamber and a portion of the cable is received in the cable slot such that the at least one blade edge cuts into the outer jacket to resist withdrawal of the cable from the chamber through the cable port.

35 Claims, 8 Drawing Sheets

(56) References Cited

U.S. PATENT DOCUMENTS

| | | | | |
|---|---|---|---|---|
| 5,561,269 | A | 10/1996 | Robertson et al. | |
| 5,569,882 | A | 10/1996 | Yokoyama et al. | |
| 5,674,089 | A | 10/1997 | Sampson | |
| 5,758,004 | A * | 5/1998 | Alarcon et al. | 385/135 |
| 5,763,835 | A | 6/1998 | Huynh-Ba et al. | |
| 5,796,041 | A | 8/1998 | Suzuki et al. | |
| 5,828,005 | A | 10/1998 | Huynh-Ba et al. | |
| 6,111,201 | A * | 8/2000 | Drane et al. | 174/92 |
| 6,303,865 | B1 | 10/2001 | Yamamoto et al. | |
| 6,333,463 | B1 | 12/2001 | Bukovnik et al. | |
| 6,416,348 | B2 | 7/2002 | Hio et al. | |
| 6,572,399 | B2 | 6/2003 | Shimirak | |
| 6,652,312 | B2 | 11/2003 | Liegl et al. | |
| 6,721,483 | B2 | 4/2004 | Grubish et al. | |
| 7,477,826 | B2 * | 1/2009 | Mullaney et al. | 385/134 |
| 2006/0153516 | A1 * | 7/2006 | Napiorkowski et al. | 385/135 |
| 2010/0166377 | A1 | 7/2010 | Nair et al. | |

FOREIGN PATENT DOCUMENTS

| | | |
|---|---|---|
| JP | 63-89809 | 4/1988 |
| JP | 5-315020 | 11/1993 |

OTHER PUBLICATIONS

Tyco Electronics Corporation, FOSC 450, Fiber Optics Splice Closure Ordering Guide, 2004, 26 Pages.

Tyco Electronics Corporation, FOSC 450 D Closure Installation Instruction: Fiber Optic Splice Closure, 2003, 26 Pages.

* cited by examiner

CABLE ENCLOSURE ASSEMBLIES AND METHODS FOR USING THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATION(S)

The present application claims the benefit of U.S. Provisional Patent Application No. 60/885,081, filed Jan. 16, 2007, the disclosure of which is hereby incorporated herein by reference in its entirety.

FIELD OF THE INVENTION

The present invention relates to cable enclosures and, more particularly, to cable enclosure assemblies and methods for using the same.

BACKGROUND OF THE INVENTION

It is often necessary or desirable to enclose cable terminations or splices in environmentally sealed enclosures. For example, an operator may wish to enclose an optical fiber cable splice or termination. Some fiber optic cables, commonly referred to as "flat drop cables", are frequently used for fiber-to-the-home connections and may require splice enclosures. Fiber optic drop cables typically include one or more strength members, one or more optical fibers, a protective buffer tube surrounding the optical fiber(s), and an outer jacket surrounding the strength member(s) and the buffer tube. Known environmental splice enclosures typically secure each cable using clamps, bolts or the like to prevent the cable from pulling out or pushing into the enclosure.

SUMMARY OF THE INVENTION

According to embodiments of the present invention, a cable enclosure for use with a cable having a lengthwise cable axis, an outer jacket and a transmission media within the outer jacket, includes a housing assembly and a strain relief structure on the housing assembly. The housing assembly defines a chamber and a cable port. The housing assembly is configured to receive the cable. The strain relief structure includes a pair of opposed engagement structures defining a cable slot therebetween. At least one of the engagement structures includes a blade edge flanking the cable slot. The cable enclosure is configured to receive the cable such that the cable extends through the cable port and into the chamber and a portion of the cable is received in the cable slot such that the at least one blade edge cuts into the outer jacket to resist withdrawal of the cable from the chamber through the cable port.

According to method embodiments of the present invention, a method for securing a cable in a cable enclosure, the cable having a lengthwise cable axis, an outer jacket and a transmission media within the outer jacket, includes providing a cable enclosure including: a housing assembly defining a chamber and a cable port, wherein the housing assembly is configured to receive the cable; and a strain relief structure on the housing assembly, the strain relief structure including a pair of opposed engagement structures defining a cable slot therebetween, at least one of the engagement structures including a blade edge flanking the cable slot. The method further includes installing the cable in the cable enclosure such that the cable extends through the cable port and into the chamber, including inserting a portion of the cable in the cable slot such that the at least one blade edge cuts into the outer jacket to resist withdrawal of the cable from the chamber through the cable port.

According to embodiments of the present invention, a strain relief device for use with a flat drop cable having a cable width, a cable height greater than the cable width, a lengthwise cable axis, an outer jacket and a transmission media within the outer jacket, includes a body, and a strain relief structure on the body. The strain relief structure includes a pair of opposed engagement structures defining a cable slot therebetween. At least one of the engagement structures includes a blade edge flanking the cable slot. The strain relief structure is configured to receive the flat drop cable such that a portion of the flat drop cable is received in the cable slot such that at least one blade edge cuts into the outer jacket to resist withdrawal of the flat drop cable from the strain relief structure. The cable slot has a slot width that is less than the cable width.

According to method embodiments of the present invention, a method for securing a flat drop cable, the flat drop cable having a cable width, a cable height greater than the cable width, a lengthwise cable axis, an outer jacket and a transmission media within the outer jacket, includes providing a strain relief device including: a body; and a strain relief structure on the body, the strain relief structure including a pair of opposed engagement structures defining a cable slot therebetween, at least one of the engagement structures including a blade edge flanking the cable slot. The method further includes installing the flat drop cable in the strain relief structure, including inserting a portion of the flat drop cable in the cable slot such that at least one blade edge cuts into the outer jacket to resist withdrawal of the flat drop cable from the strain relief structure.

According to embodiments of the present invention, a cable enclosure for use with a cable having a lengthwise cable axis, an outer jacket and a transmission media and a strength member within the outer jacket, the outer jacket and the strength member each having a terminal end, includes a housing assembly and at least one strength member pocket wall on the housing assembly. The housing assembly defines a chamber and a cable port. The housing assembly is configured to receive the cable. The at least one strength member pocket wall defines a strength member pocket. The cable enclosure is configured to receive the cable such that the cable extends through the cable port, the transmission media extends into the chamber, and the terminal end of the strength member is contained in the strength member pocket to limit intrusion of the jacket and intrusion of the strength member into the housing assembly through the cable port.

According to method embodiments of the present invention, a method is provided for securing a cable in cable enclosure, the cable having a lengthwise cable axis, an outer jacket and a transmission media and a strength member within the outer jacket, the outer jacket and the strength member each having a terminal end. The method includes providing a cable enclosure including: a housing assembly defining a chamber and a cable port, wherein the housing assembly is configured to receive the cable; and at least one strength member pocket wall on the housing assembly defining a strength member pocket. The method further includes installing the cable in the cable enclosure such that the cable extends through the cable port, the transmission media extends into the chamber, and the terminal end of the strength member is contained in the strength member pocket to limit intrusion of the jacket and intrusion of the strength member into the housing assembly through the cable port.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

Figure 1:
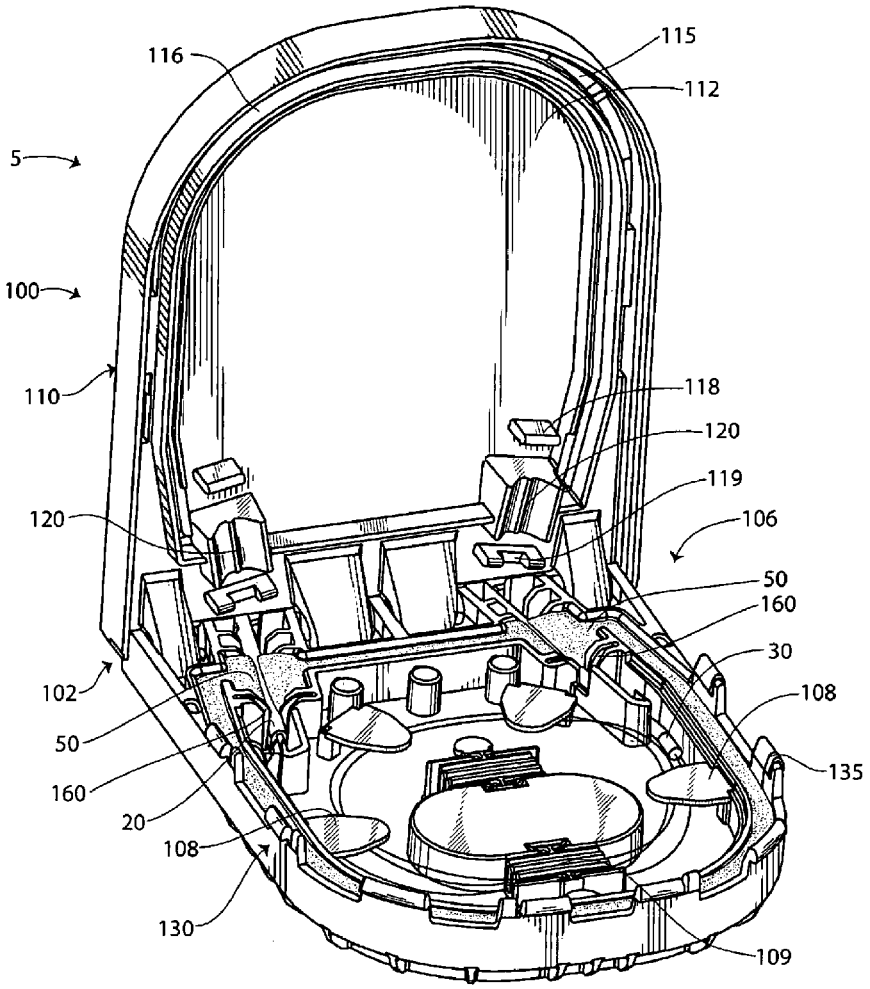
FIG. 1 is a rear perspective view of a splice connection assembly including a cable enclosure assembly according to embodiments of the present invention, wherein the cable enclosure assembly is in an open position.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the present invention provide cable enclosure assemblies for securing and/or environmentally protecting cable terminations or splices. More particularly, according to some embodiments, a cable enclosure assembly includes a cable sealant and a mechanism to displace the cable sealant about a circumference of the cable to effect improved or complete coverage of the sealant about the cable. According to some embodiments, a mechanism is provided to close or fill a sealant triple point void to prevent the formation of an unsealed passageway. Still further embodiments provide mechanisms for resisting pull out of the cable from the enclosure and/or for resisting push in or intrusion of the cable into the enclosure without requiring the use of bolts, clamps, or the like.

Figure 2:
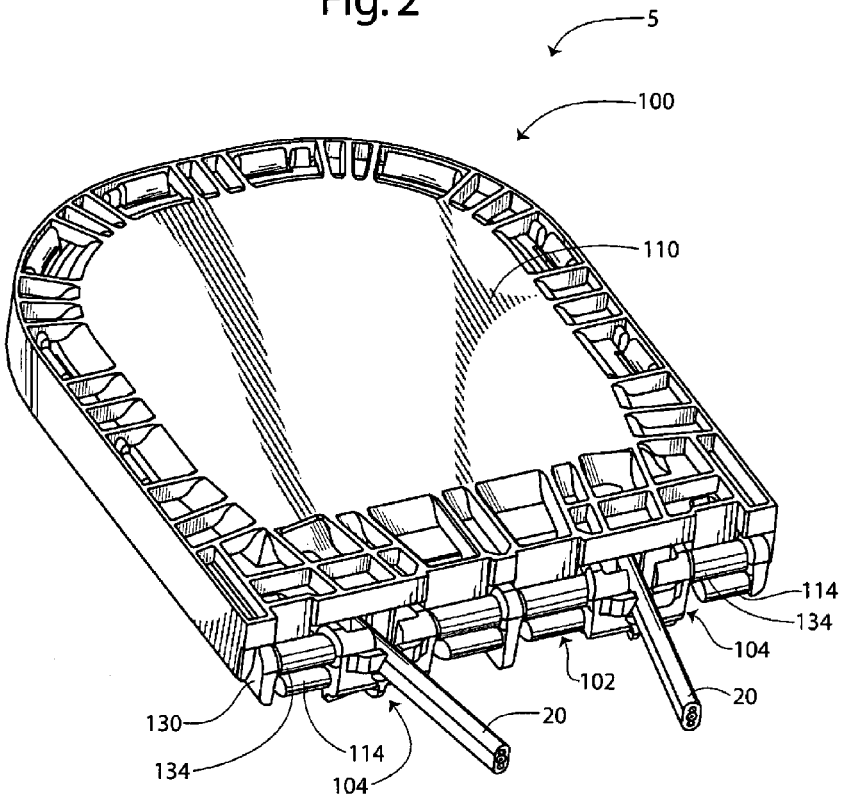
FIG. 2 is a front perspective view of the splice connection assembly of FIG. 1, wherein the cable enclosure assembly is in a closed position.

With reference to FIGS. 1 and 2, a cable enclosure assembly 100 according to embodiments of the present invention is shown therein. The cable enclosure assembly 100 includes a first housing part 110 (referred to herein as the "top housing part"), a second housing part 130 (referred to herein as the "bottom housing part"), a strain relief member 160, two masses of flowable cable sealant 50 and flowable perimeter sealant 56. The assembly 100 includes a hinge mechanism 102 (FIG. 2) so that the housing parts 110, 130 are relatively pivotable between an open position as shown in FIG. 1 and a closed position as shown in FIG. 2. In the closed position, the assembly 100 defines a chamber 106 (FIG. 1). The assembly 100 may be referred to as a clamshell cable enclosure. Cable ports 104 (FIG. 2) communicate with the chamber 106 and the exterior of the assembly 100. The assembly 100 may be used with cables 20 to form a splice connection assembly 5 (FIGS. 1 and 2), for example.

Figure 5:
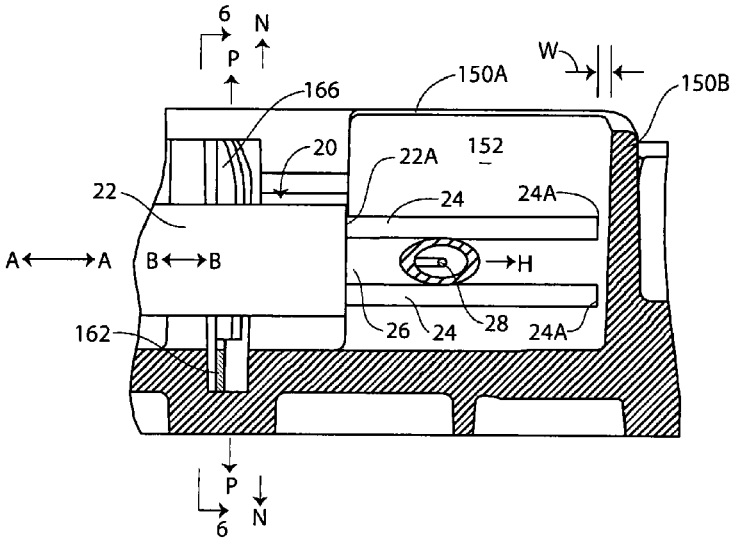
FIG. 5 is an enlarged, fragmentary, cross-sectional view of the cable enclosure assembly of FIG. 1 taken along the line 5-5 of FIG. 4, wherein the sealant is omitted for the purpose of explanation.

As illustrated and with reference to FIG. 5, the cables 20 are each optical fiber flat drop cables including an optical fiber 28, an inner jacket or buffer tube 26 surrounding the optical fiber 28, a pair of strength members 24, and an outer jacket 22 surrounding the components 24, 26, 28. The jacket 22 and the buffer tube 26 may be formed of any suitable material, such as a polymeric material. The jacket 22 may be extruded over the strength members 24 and the buffer tube 26. According to some embodiments, the jacket 22 tightly covers and conforms to the strength members 24 and the buffer tube 26. The optical fiber 28 may be loosely contained in the buffer tube 26. A gel or other sealant may be placed in the buffer tube 26. The strength members 24 may be formed of any suitable material, including a relatively stiff, hard material. Suitable materials for the strength members may include steel or fiberglass. The optical fiber 28 may be formed of glass, for example. While a single optical fiber 28 is shown in each cable 20, one or both of the cables 20 may include multiple optical fibers (e.g., twelve each) bundled in a common buffer tube 26, for example. Each cable 20 has a longitudinal or lengthwise cable axis A-A (FIG. 5), a cross-sectional width dimension D (FIG. 6), and a cross-sectional height dimension C (FIG. 6) that is greater than the width dimension D.

With reference to FIGS. 1 and 2, the top housing part 110 includes a body 112, hinge structures 114, latch structures 115, a perimeter sealing flange 116, locator structures 118, 119, and a compression feature or projection 120.

The bottom housing part 130 includes a body 132, hinge structures 134 (FIG. 2), latch structures 135, a perimeter sealant channel 136 (FIG. 3), a pair of containment wall structures 140 (FIGS. 3, 4 and 8), and a pair of strength member pocket wall structures 150 (FIGS. 3-5, 7 and 8). The hinge structures 134 mate with the hinge structures 114 to form the hinge mechanism 102 (FIG. 2). The latch structures 135 mate with the latch structures 115 to lock the assembly 100 in the closed position (FIG. 2). The perimeter sealant 56 is disposed in the perimeter channel 136.

Figure 4:
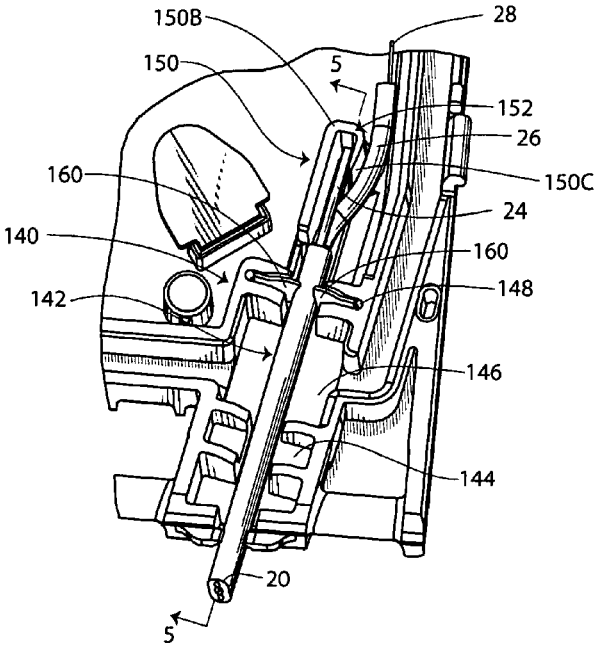
FIG. 4 is an enlarged, fragmentary, perspective view of the cable enclosure assembly of FIG. 1 with a cable mounted therein, wherein a sealant forming a part of the cable enclosure assembly is omitted for the purpose of explanation.

With reference to FIG. 4, each wall structure 140 defines a cable passage 142 communicating with a respective one of the cable ports 104 (FIG. 2). The wall structure 140 further defines a rear slot 144, a sealant cavity 146 and a strain relief member holding slot 148. A mass of cable sealant 50 (FIG. 8) is disposed in each sealant cavity 146.

With reference to FIGS. 4 and 5, each strength member pocket wall structure 150 includes an inner wall 150A, an end wall 150B, and an outer wall 150C collectively defining a strength member pocket or cavity 152 (FIG. 7) and a sideward opening 154 (FIG. 7) communicating with the strength member pocket 152.

The housing parts 110, 130 may each be formed of any suitable material. According to some embodiments, the housing parts 110, 130 are formed of a polymeric material. Suitable polymeric materials may include, polypropylene and its derivatives, or polycarbonate, for example.

Figure 6:
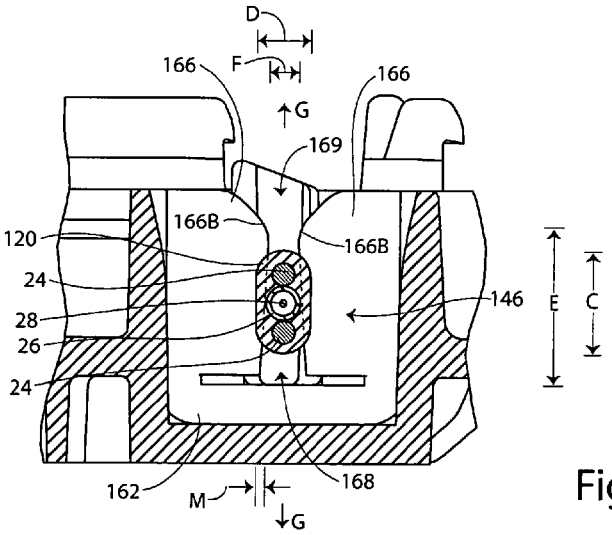
FIG. 6 is an enlarged, fragmentary, cross-sectional view of the cable enclosure assembly of FIG. 1 taken along the line 6-6 of FIG. 5, wherein the sealant is omitted for the purpose of explanation.
Figure 7:
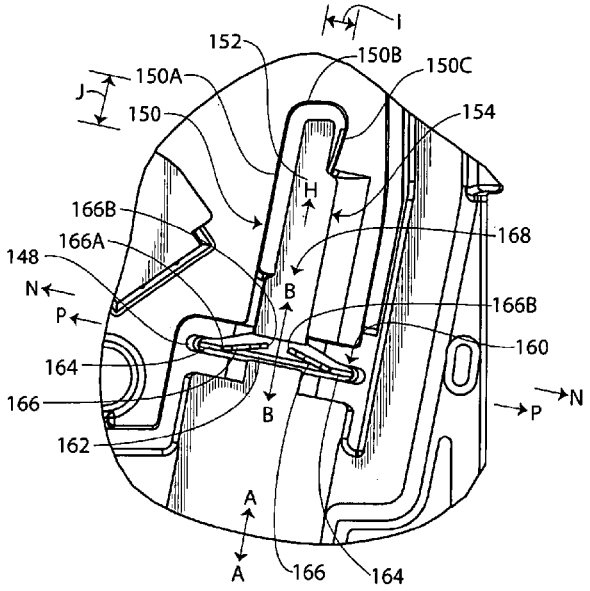
FIG. 7 is an enlarged, fragmentary, top plan view of the cable enclosure assembly of FIG. 1 prior to installation of the cable and wherein the sealant thereof is omitted for the purpose of explanation.
Figure 8:
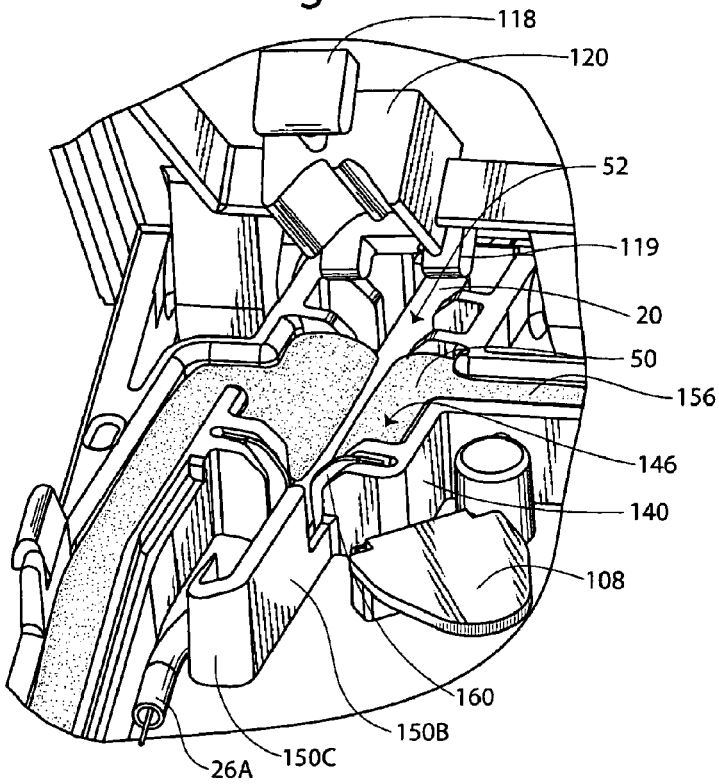
FIG. 8 is an enlarged, fragmentary, rear perspective view of the cable enclosure assembly of FIG. 1 wherein the cable is installed in the bottom housing part and a top housing part of the cable enclosure assembly has not yet been moved to the closed position.

With reference to FIGS. 6 and 7, the strain relief member 160 includes a base strip 162, a pair of upstanding opposed side posts 164, and a pair of opposed engagement tabs 166. Each engagement tab 166 has a fixed end 166A adjoining a respective one of the posts 164 so that the engagement tab 166 is flexibly cantilevered from the post 164. Each engagement tab 166 also has a knife edge 166B opposite its fixed end 166A. The knife edges 166B and the base strip 162 together to find a general U-shaped cable slot 168 therebetween and a top opening 169 communicating with the top end of the cable slot 168. The strain relief member 160 is securely mounted in the slot 148 of the bottom housing part 130. According to some embodiments, the base strip 162 and the side posts 164 are press fit into the slot 148. The slot 148 is shaped to permit the blade tabs 166 to deflect inwardly (i.e., away from the cable port 104) up to a prescribed deflection distance.

The cable slot 168 defines a passthrough axis B-B (FIG. 7) extending lengthwise through the cable slot 168. The knife edges 166B also define a blade axis G-G (FIG. 6) transverse (according to some embodiments and as shown, perpendicular) to the passthrough axis B-B. The fixed ends 166A define a primary strain relief member plane P-P (FIGS. 5 and 7) and the blade tabs 166 are angled out of the plane P-P and taper radially inwardly with respect to the pass through axis B-B in a direction away from the port 104. According to some embodiments, a slot plane N-N (FIGS. 5 and 7) defined by the blade edges 166B is substantially orthogonal to the passthrough axis B-B.

According to some embodiments, the blade tabs 166 are each disposed at an angle of between about 10 and 20 degrees with respect to the plane P-P.

The cable slot 168 has a nominal width F and a height E (FIG. 6). According to some embodiments, the width F is less than the nominal outer diameter D of the smallest cable 20 intended for use with the assembly 100. According to some embodiments, the width F is at least 0.6 inch less than the nominal outer diameter of the smallest cable 20 intended for use with the assembly 100.

Figure 9:
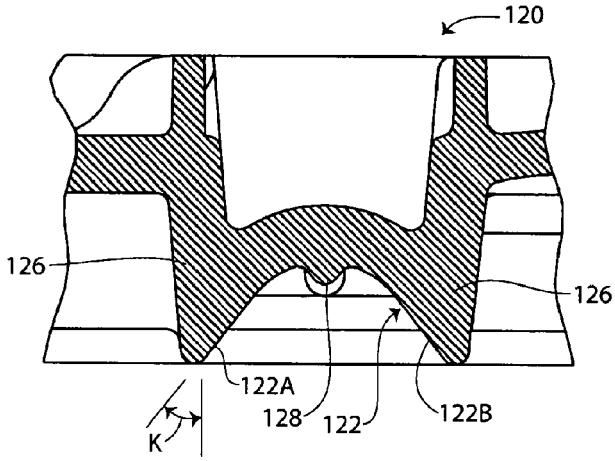
FIG. 9 is an enlarged, fragmentary, cross-sectional view of a compression feature of the cable enclosure assembly of FIG. 1.

The compression feature 120 may be integrally molded with the body 112 of the top housing part 110. The compression feature 120 includes an inner engagement surface 122 having opposed side surfaces 122A, 122B. According to some embodiments and as shown, the surface 122 is generally arcuate and concave (according to some embodiments, generally cup-shaped) in cross-section so that the channel defined thereby is truncated cylindrical (e.g., semi-cylindrical) overall. According to some embodiments, each side surface 122A, 122B forms an angle K (FIG. 9) of between about 25 and 45 degrees with respect to the blade axis G-G. The compression feature 120 may define opposed prongs 126 extending toward the sealant cavity 146 when the assembly 100 is closed.

A triple point filler feature 128 extends downwardly from the engagement surface 122. The triple point filler feature 128 may take the form of a lengthwise extending ridge. According to some embodiments, the triple point filler feature 128 is generally arcuate and convex in cross-section so that it is truncated cylindrical (e.g., semi-cylindrical) overall.

A plurality of clips 108 may be mounted in the bottom housing part 130 and used to manage the optical fibers 28 as discussed below. One or more splice holders 109 may be mounted in the bottom housing part 130 and used to hold one or more splices as discussed below.

The sealants 50, 56 may be any suitable sealants. According to some embodiments, the sealant 50 is a gel sealant. According to some embodiments, the sealant 56 is a gel sealant. According to some embodiments, both of the sealants

50, 56 are gel sealants. As used herein, "gel" refers to the category of materials which are solids extended by a fluid extender. The gel may be a substantially dilute system that exhibits no steady state flow. As discussed in Ferry, "Viscoelastic Properties of Polymers," 3rd ed. P. 529 (J. Wiley & Sons, New York 1980), a polymer gel may be a cross-linked solution whether linked by chemical bonds or crystallites or some other kind of junction. The absence of the steady state flow may be considered to be the definition of the solid-like properties while the substantial dilution may be necessary to give the relatively low modulus of gels. The solid nature may be achieved by a continuous network structure formed in the material generally through crosslinking the polymer chains through some kind of junction or the creation of domains of associated substituents of various branch chains of the polymer. The crosslinking can be either physical or chemical as long as the crosslink sites may be sustained at the use conditions of the gel.

Gels for use in this invention may be silicone (organopolysiloxane) gels, such as the fluid-extended systems taught in U.S. Pat. No. 4,634,207 to Debbaut (hereinafter "Debbaut '207"); U.S. Pat. No. 4,680,233 to Camin et al.; U.S. Pat. No. 4,777,063 to Dubrow et al.; and U.S. Pat. No. 5,079,300 to Dubrow et al. (hereinafter "Dubrow '300"), the disclosures of each of which are hereby incorporated herein by reference. These fluid-extended silicone gels may be created with non-reactive fluid extenders as in the previously recited patents or with an excess of a reactive liquid, e.g., a vinyl-rich silicone fluid, such that it acts like an extender, as exemplified by the Sylgarde 200 product commercially available from Dow-Corning of Midland, Mich. or as disclosed in U.S. Pat. No. 3,020,260 to Nelson. Because curing is generally involved in the preparation of these gels, they are sometimes referred to as thermosetting gels. The gel may be a silicone gel produced from a mixture of divinyl terminated polydimethylsiloxane, tetrakis (dimethylsiloxy)silane, a platinum divinyltetramethyldisiloxane complex, commercially available from United Chemical Technologies, Inc. of Bristol, Pa., polydimethylsiloxane, and 1,3,5,7-tetravinyltetra-methylcyclotetrasiloxane (reaction inhibitor for providing adequate pot life).

Other types of gels may be used, for example, polyurethane gels as taught in the aforementioned Debbaut '261 and U.S. Pat. No. 5,140,476 to Debbaut (hereinafter "Debbaut '476") and gels based on styrene-ethylene butylenestyrene (SEBS) or styrene-ethylene propylene-styrene (SEPSS) extended with an extender oil of naphthenic or nonaromatic or low aramatic content hydrocarbon oil, as described in U.S. Pat. No. 4,369,284 to Chen; U.S. Pat. No. 4,716,183 to Gamarra et al.; and U.S. Pat. No. 4,942,270 to Gamarra. The SEBS and SEPS gels comprise glassy styrenic microphases interconnected by a fluid-extended elastomeric phase. The microphase-separated styrenic domains serve as the junction points in the systems. The SEBS and SEPS gels are examples of thermoplastic systems.

Another class of gels which may be used are EPDM rubber-based gels, as described in U.S. Pat. No. 5,177,143 to Chang et al.

Yet another class of gels which may be used are based on anhydride-containing polymers, as disclosed in WO 96/23007. These gels reportedly have good thermal resistance.

The gel may include a variety of additives, including stabilizers and antioxidants such as hindered phenols (e.g., Irganox™ 1076, commercially available from Ciba-Geigy Corp. of Tarrytown, N.Y.), phosphites (e.g, Irgafos™ 168, commercially available from Ciba-Geigy Corp. of Tarrytown, N.Y.), metal deactivators (e.g., Irganox™ D1024 from Ciba-Geigy Corp. of Tarrytown, N.Y.), and sulfides (e.g., Cyanox LTDP, commercially available from American Cyanamid Co. of Wayne, N.J.), light stabilizers (e.g., Cyasorb UV-531, commercially available from American Cyanamid Co. of Wayne, N.J.), and flame retardants such as halogenated paraffins (e.g., Bromoklor 50, commercially available from Ferro Corp. of Hammond, Ind.) and/or phosphorous containing organic compounds (e.g., Fyrol PCF and Phosflex 390, both commercially available from Akzo Nobel Chemicals Inc. of Dobbs Ferry, N.Y.) and acid scavengers (e.g., DHT-4A, commercially available from Kyowa Chemical Industry Co. Ltd through Mitsui & Co. of Cleveland, Ohio, and hydrotalcite). Other suitable additives include colorants, biocides, tackifiers and the like described in "Additives for Plastics, Edition 1" published by D.A.T.A., Inc. and The International Plastics Selector, Inc., San Diego, Calif.

The hardness, stress relaxation, and tack may be measured using a Texture Technologies Texture Analyzer TA-XT2 commercially available from Texture Technologies Corp. of Scarsdale, N.Y., or like machines, having a five kilogram load cell to measure force, a 5 gram trigger, and ¼ inch (6.35 mm) stainless steel ball probe as described in Dubrow '300, the disclosure of which is incorporated herein by reference in its entirety. For example, for measuring the hardness of a gel a 60 mL glass vial with about 20 grams of gel, or alternately a stack of nine 2 inch×2 inch×⅛" thick slabs of gel, is placed in the Texture Technologies Texture Analyzer and the probe is forced into the gel at the speed of 0.2 mm/sec to a penetration distance of 4.0 mm. The hardness of the gel is the force in grams, as recorded by a computer, required to force the probe at that speed to penetrate or deform the surface of the gel specified for 4.0 mm. Higher numbers signify harder gels. The data from the Texture Analyzer TA-XT2 may be analyzed on an IBM PC or like computer, running Microsystems Ltd, XT.RA Dimension Version 2.3 software.

The tack and stress relaxation are read from the stress curve generated when the XT.RA Dimension version 2.3 software automatically traces the force versus time curve experienced by the load cell when the penetration speed is 2.0 mm/second and the probe is forced into the gel a penetration distance of about 4.0 mm. The probe is held at 4.0 mm penetration for 1 minute and withdrawn at a speed of 2.00 mm/second. The stress relaxation is the ratio of the initial force ($F_i$) resisting the probe at the pre-set penetration depth minus the force resisting the probe ($F_f$) after 1 min divided by the initial force $F_i$, expressed as a percentage. That is, percent stress relaxation is equal to $$\frac{(F_i - F_f)}{F_i} \times 100\%$$

where $F_i$ and $F_f$ are in grams. In other words, the stress relaxation is the ratio of the initial force minus the force after 1 minute over the initial force. It may be considered to be a measure of the ability of the gel to relax any induced compression placed on the gel. The tack may be considered to be the amount of force in grams resistance on the probe as it is pulled out of the gel when the probe is withdrawn at a speed of 2.0 mm/second from the preset penetration depth.

An alternative way to characterize the gels is by cone penetration parameters according to ASTM D-217 as proposed in Debbaut '261; Debbaut '207; Debbaut '746; and U.S. Pat. No. 5,357,057 to Debbaut et al., each of which is incorporated herein by reference in its entirety. Cone penetration ("CP") values may range from about 70 ($10^{-1}$ mm) to about 400 ($10^{-1}$ mm). Harder gels may generally have CP values from about 70 ($10^{-1}$ mm) to about 120 ($10^{-1}$ mm). Softer gels may generally have CP values from about 200 ($10^{-1}$ mm) to about 400 ($10^{-1}$ mm), with particularly preferred range of from about 250 ($10^{-1}$ mm) to about 375 ($10^{-1}$ mm). For a particular materials system, a relationship between CP and Voland gram hardness can be developed as proposed in U.S. Pat. No. 4,852,646 to Dittmer et al.

According to some embodiments, the gel has a Voland hardness, as measured by a texture analyzer, of between about 5 and 100 grams force. The gel may have an elongation, as measured by ASTM D-638, of at least 55%. According to some embodiments, the elongation is of at least 100%. The gel may have a stress relaxation of less than 80%. The gel may have a tack greater than about 1 gram. Suitable gel materials include POWERGEL sealant gel available from Tyco Electronics Energy Division of Fuquay-Varina, N.C. under the RAYCHEM brand.

While, in accordance with some embodiments, the sealants 50, 56 are gels as described above, other types of sealants may be employed. For example, the sealants 50, 56 may be silicone grease or hydrocarbon-based grease.

According to some embodiments, the sealants 50, 56 are initially provided only in the bottom housing part 130. For example, the assembly 100 as manufactured may include sealant only in the bottom housing part 130 with the top housing part 110 being free of sealant.

The assembly 100 may be used in the following manner to form a splice connection assembly 5, for example. Each cable 20 is prepared. More particularly, the outer jacket 22, the strength members 24, the buffer tube 26 and the optical fiber 29 are trimmed to provide an outer jacket terminal end 22A, respective strength member terminal ends 24A extending beyond the jacket terminal end 22A, and a buffer tube terminal end 26A extending beyond the strength member terminal ends 24A, with the optical fiber 28 extending beyond the buffer tube terminal end 26A.

Each of the cables 20 is aligned with one of the cable passages 142 and its associated cable port 104. The cable 20 is then pressed downwardly so that the jacket 22 slides into the passage 142, the cable slot 168 of the strain relief member 160, and the cable sealant 50.

In the foregoing manner, the cable 20 displaces the cable sealant 50 so that the portion of the cable 20 in the sealant cavity 146 becomes at least partially surrounded by the cable sealant 50. The cable 20 may form a sealant void or trough 52 in the cable sealant 50.

The cable enters the cable slot 168 through the top opening 169. The relative shapes of the cable 20 and the slot 168 ensure that the cable 20 slides into the cable slot 168 along the blade axis G-G and is properly oriented during insertion and once seated. Depending on the size of the cable 20, the blade tabs 166 may deflect or flare inwardly (i.e., away from the port 104) to expand to accommodate the cable width D. According to some embodiments, once the cable 20 is installed, the cable axis A-A extends substantially orthogonal to the slot plane N-N.

The knife edges 166B of the blade tabs 166 cut radially into the outer jacket 22 of the cable 20 a distance M (FIG. 6). According to some embodiments, the cut depth M is at least about 0.005 inch. According to some embodiments, the cut depth M is between about 0.005 and 0.025 inch. According to some embodiments, the knife edges 166B cut into the outer jacket 22 but do not cut into the buffer tube 26. According to some embodiments, the alignment of the strength members 24 along the blade axis G-G ensures that, in the event the knife edges 166B cut more deeply through the outer jacket 22 (for example, as a result of vibration or tensioning of the cable 20), the knife edges 166B will engage the strength members 24 before engaging the buffer tube 26, thereby inhibiting or preventing the knife edges 166B from cutting through the buffer tube 26.

The strength member 24 is routed or laid into the strength member pocket 152 such that the strength member terminal ends 24A are positioned adjacent the end wall 150B as shown in FIGS. 4 and 5. According to some embodiments, the gap defined between the terminal ends 24A and the end wall 150B is in the range of from about zero to 0.15 inch.

Figure 3:
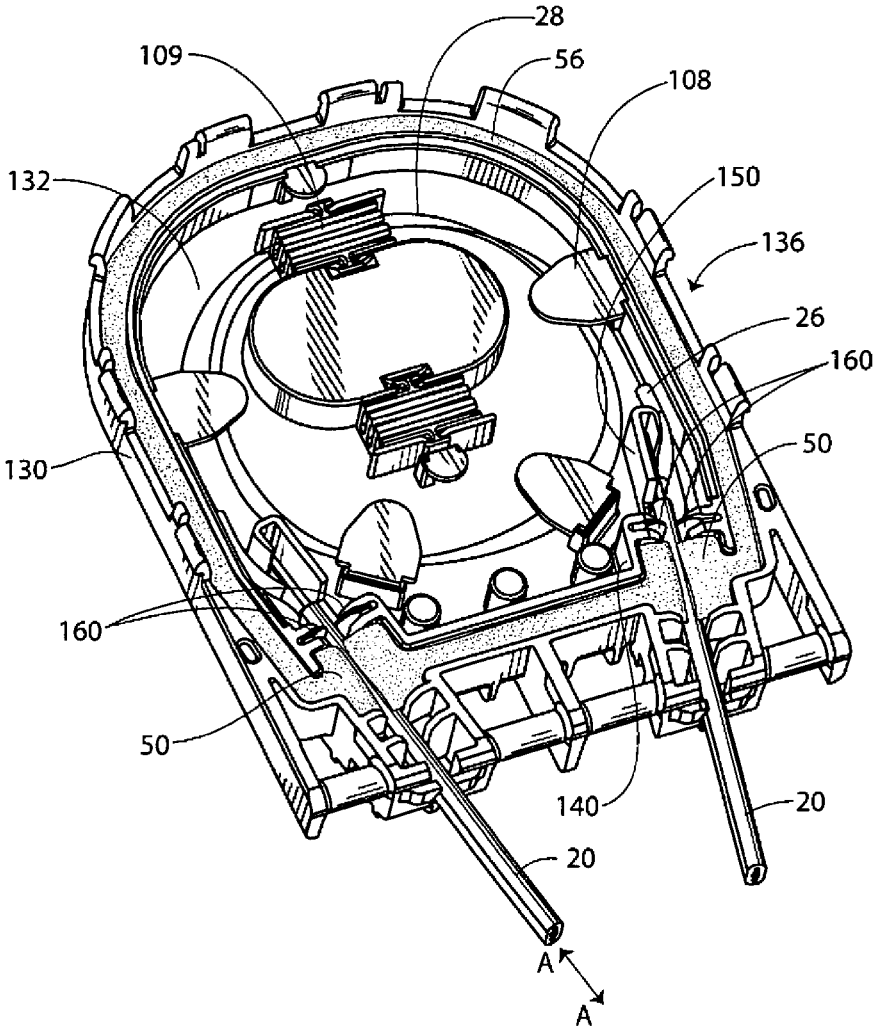
FIG. 3 is a perspective view of a bottom housing part of the cable enclosure assembly of FIG. 1 with cables mounted therein.

The buffer tube 26 is routed out of the cable passage 142 through the side opening 154, around the wall structure 140, and into the main chamber 106 of the bottom housing part 130 as shown in FIGS. 3 and 4. As shown in FIG. 3, the optical fiber 28 may be wound about the chamber 106 and retained by the clips 108 and ultimately spliced (e.g., by splice fusing) to the fiber 28 of the other cable 20. The splice may be mounted in the splice holder 109.

With the cable 20 mounted in the bottom housing part 130, the top housing part 110 is then mounted on the bottom housing part 130. The hinge structures 114 are interlocked with the hinge structures 134 to form the hinge mechanism 102 as shown in FIG. 1. According to some embodiments, the housing parts 110, 130 may be pre-coupled by the hinge mechanism 102 or another suitable releasable or permanent hinge mechanism.

The housing parts 110, 130 are pivoted with respect to one another about the hinge mechanism 102 to close the assembly 100 until the latch structures 115, 135 interlock to secure the assembly in its closed position.

The closure of the assembly 100 also effectuates a perimeter environmental seal and environmental seals about each of the cables 20. The perimeter seal is created by the sealant channel 136, the perimeter sealant 56 and the perimeter flange 116. As the housing parts 110, 130 are closed, the flange 116 enters the channel 136 and displaces the sealant 56. This perimeter seal may be maintained so long as the latch structures 115, 136 remain interlocked.

Each cable seal is provided by the respective cable sealant 50, wall structure 140, and compression feature 120. Typically, lateral insertion of the cable 20 into the cable sealant 50 will result in unreliable, incomplete or inadequate coverage of the cable 20 with sealant. As discussed above, insertion of the cable 20 into the cable sealant 50 may form a sealant trough 52. The compression feature 120 serves to displace the cable sealant 50 in a manner that ensures proper ultimate positioning of the cable sealant 50.

Figure 10A:
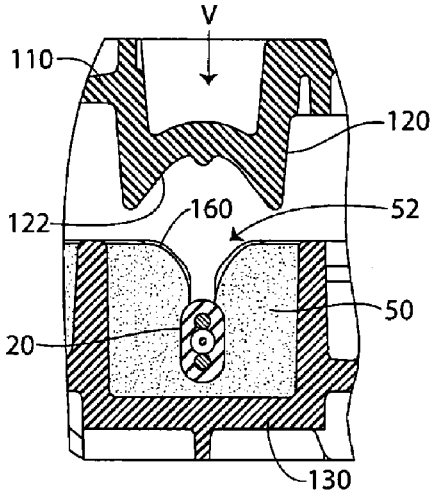
FIGS. 10A, 10B and 10C are enlarged, fragmentary, cross-sectional views of the cable enclosure assembly of FIG. 1 with the compression feature of the cable enclosure assembly is in various positions.
Figure 10B:
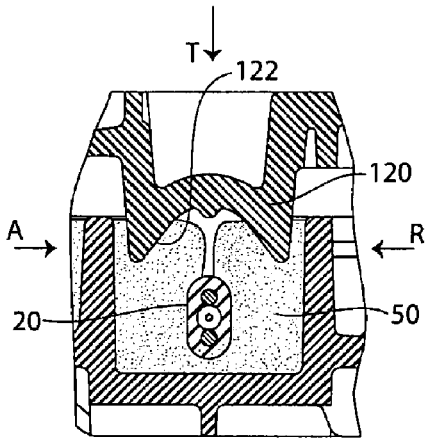
Figure 10C:
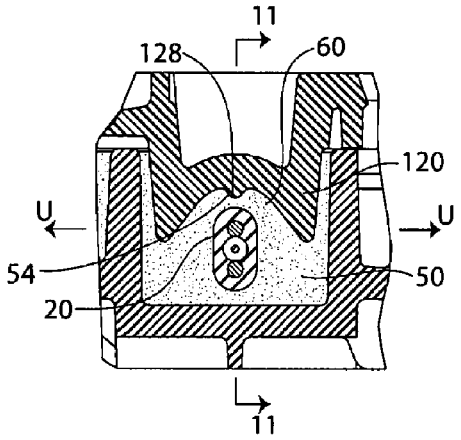
Figure 11:
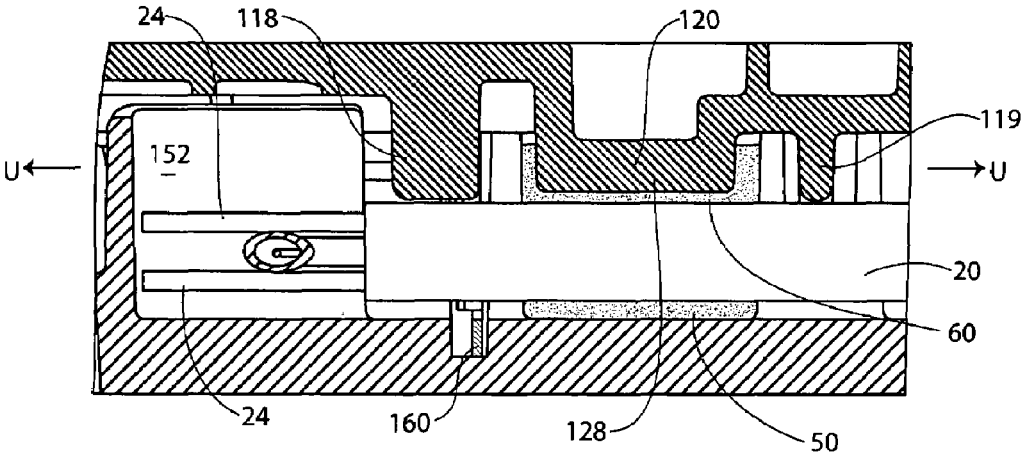
FIG. 11 is an enlarged, fragmentary, cross-sectional view of the splice connection assembly of FIG. 1 taken along the line 11-11 of FIG. 10C.

FIGS. 10A-10C and 11 show a closure sequence of the assembly 100. To form the cable seal, the compression feature 120 is moved in an installation direction V (FIG. 10A) toward the sealant cavity 146. In FIG. 10A, the cable 20 is installed in the strain relief member 160 and the top housing part 110 is still spaced apart from the bottom housing part 130 in a ready position such that the compression member 120 does not yet engage the cable sealant 50. In FIG. 10B, the top housing part 110 is partially closed onto the bottom housing part 130. The cable sealant 50 is partially displaced by the compression feature 120. In FIGS. 10C and 11, the assembly 100 is fully closed and the cable sealant 50 is fully displaced by the compression member 120, which is in an installed position. The compression member 120 is seated in the sealant cavity 146.

The compression member 120 (and, more particularly, the engagement surfaces 122A, 122B (FIG. 9)) is shaped such that it forces the cable sealant 50 to flow about the cable 20 in opposed inward directions Q and R (FIG. 10B) transverse (e.g, perpendicular) or generally radial to the cable axis A-A (FIG. 3) and transverse to the installation direction V to circumferentially surround the portion of the cable 20 in the sealant cavity 146. The engagement surfaces 122A, 122B apply a compressive load to the cable sealant 50 in each of the sideward directions Q, R and a downward direction T (FIG. 10B) substantially parallel to the installation direction V, transverse (e.g., perpendicular) to the cable axis A-A and substantially perpendicular to the plane U (FIGS. 10C and 11) defined between the housing parts 110, 130 when the assembly 100 is closed.

As discussed above, a sealant trough 52 may initially be present in the cable sealant 50. The compression member 120 may be configured to force the cable sealant 50 to flow about the cable 20 to fill the trough 52 with sealant 50 when the compression member 120 is moved into the closed position.

According to some embodiments, when the assembly 100 is closed, a buffer region 60 (FIG. 10C) is defined between the cable 20 and the compression feature 120. The compression feature 120 forces the cable sealant 50 to flow into and fill, at least in part, the buffer region 60. As best seen in FIG. 11, the locator features 118, 119 serve to ensure that the cable 20 is properly spaced apart from the compression member 120 to maintain the buffer region 60. The locator features 118, 119 also serve to properly position the cable 20 in the cable slot 168 of the strain relief member 160.

Figure 12:
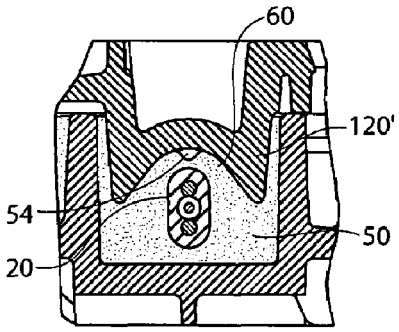
FIG. 12 is an enlarged, fragmentary, cross-sectional view of an alternative embodiment of the cable enclosure assembly wherein a triple point filler feature is not provided.

The triple point filler feature 128 may serve to fill a triple point channel 54 in the cable sealant 50 when the assembly 100 is closed. For the purpose of explanation, an alternative embodiment is shown in FIG. 12 wherein a compression feature 120' having no triple point filler feature 128 is provided. When sealants such as gels, mastics and viscous materials are compressed around an object, they may meet at a triple point 54. A triple point is an intersection of three sealing surfaces where a roughly triangular leak path is created. Typically, this leak path should be sealed off. In many cases, extraordinarily high pressures must be applied to the sealant in order to reduce this triangular leak path to zero and create a perfect or satisfactory seal. As the triangular space becomes smaller and smaller, more and more pressure is required to eliminate the space or leak path.

Referring again to FIG. 10C, the triple point filler feature 128 fills the triple point channel 54 so that it is not necessary to eliminate the triple point channel 54 by further displacing the sealant 50. In this manner, the triple point filler feature 128 may greatly reduce the amount of compression required to force the cable sealant 50 to completely seal about the portion of the cable 20 without permitting remaining leak paths.

The strain relief member 160 and the protrusion pocket wall structure 150 may reliably and satisfactorily secure each cable 20 in the assembly 100 without requiring the use of bolts, clamps, or the like to secure the strength members 24. The cable 20 is strain relieved and pull out is limited or prevented by the strain relief member 160. The blade tabs 166 may function like barbs and grip the cable 20 more tightly when the cable 20 is pulled away from the assembly 100, thereby tenaciously preventing axial withdrawal of the cable 20 from the assembly 100. The strain relief member 160 and the pocket wall structure 150 may separate the functions of limiting or resisting withdrawal of the cable 20 from the assembly 100 and limiting or resisting insertion or protrusion of the cable into the assembly 100.

As illustrated, the slot 168 of the strain relief member 160 may have a width F that is much less than the width D of the cable 20 so that the cable 20 can only be inserted into the slot 168 in one orientation, namely, such that its height dimension C (i.e., the greater cross-sectional dimension) is parallel to or substantially coincident with the slot depthwise axis or blade axis G-G. This may ensure that the symmetrical axis G-G of the slot 168 passes through the center of each strength member 24 and the buffer tube 26 containing the fiber 28. As discussed above, this configuration may ensure that the knife edges 166B contact the strength members 24 before contacting the buffer tube 26, thereby preventing damage to the fiber 28 itself.

The strength member pocket wall structure 150 may serve to limit or prevent axial sliding of the cable 20 or the strength members 24 into the enclosure 100. In the event the cable 20 is forced into the enclosure 100, the terminal ends 24A of the strength member 24 will abut the end wall 150B to resist cable intrusion that may damage the fiber 28. Strength member protrusion is a known phenomenon wherein cable strength members extend and retract in length as a result of thermal expansion and contraction. The pocket wall structure 150 defines the strength member pocket 152 within which the strength members 24 will be contained in the event the strength members protrude inwardly (i.e., generally in an intrusion direction H (FIG. 7)), thereby preventing the strength members 24 from progressing further inwardly and damaging the fiber 28. According to some embodiments, the width I and the contained depth J (FIG. 7) of the pocket 152 are selected to be sufficiently narrow and short that the strength members 24 cannot buckle under columnar loading in the even the strength members 24 protrude in and bottom out in the pocket 152. According to some embodiments, the strength members 24 are trimmed and installed in the pocket 152 such that the initial spacing W (FIG. 5) between the terminal ends 24A of the strength members 24 and the wall 150B is in the range of from about zero to 0.15 inch. The side opening 154 (FIG. 7) is sized and positioned to allow the buffer tube 26 to pass around the wall structure 150 without excessively bending the fiber 28 in the buffer tube 26.

The cable sealing system according to embodiments of the present invention can provide an effective, reliable and convenient environmental seal about a cable. The cable sealing system may be particularly well-suited for small diameter fiber optic cables (e.g., from about 0.1 to 0.3 inch in diameter). In particular, the sealing system may be employed with flat drop fiber optic cables having an approximately oval cross-section. The cable sealing system may allow the use of a two-piece or two-sided housing assembly having sealant in only one piece or side of the housing assembly.

The piston (i.e., compression feature 120) and bore (i.e., cable sealant cavity 146 defined by the wall structure 140) configuration of the cable sealing system may enable relatively high compression loading of the sealant 50 while also limiting egress of the sealant 50 from the sealant cavity 146 or the assembly 100. When, as illustrated, the compression feature 120 is located adjacent the hinge mechanism 102 and distal from the opposed, free ends of the housing parts 110, 130, the assembly may provide improved mechanical leverage advantage so that substantial compression loading can be imparted to the sealant 50 by manually closing the assembly 100.

The assembly 100 may provide a reliable (and, in at least some embodiments, moisture-tight) seal between the assembly 100 and the cables 20. The sealant 50 may accommodate cables of different sizes within a prescribed range.

When the sealant 50 is a gel, the compression feature 120 applies a compressive force to the sealant 50. The gel is thereby elongated and is generally deformed and substantially conforms to the outer surface of the cable 20 and to the inner surfaces of the assembly 100. Some shearing of the gel may occur as well. Preferably, at least some of the gel deformation is elastic. The restoring force in the gel resulting from this elastic deformation causes the gel to operate as a spring exerting an outward force between the assembly 100 and the cable 20.

Various properties of the gel, as described above, may ensure that the gel sealant 50 maintains a reliable and long lasting hermetic seal between the assembly 100 and the cable 20. The elastic memory and the retained or restoring force in the elongated, elastically deformed gel generally cause the gel to bear against the mating surfaces of the cable 20 and the assembly 100. Also, the tack of the gel may provide adhesion between the gel and these surfaces. The gel, even though it is cold-applied, is generally able to flow about the cable 20 and the limiter module 100 to accommodate their irregular geometries. According to some embodiments, each sealant 50, 56 is a self-healing or self-amalgamating gel.

While cables 20 having optical fibers 28 as transmission media have been disclosed herein, according to further embodiments, cables having other types of transmission media (e.g., electrical conductors formed of copper or other metal) may be used.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A cable enclosure for use with a cable having a lengthwise cable axis, an outer jacket and a transmission media within the outer jacket, the cable enclosure comprising:

a housing assembly defining a chamber and a cable port, wherein the housing assembly is configured to receive the cable; and a strain relief structure on the housing assembly, the strain relief structure including a pair of opposed engagement structures defining a cable slot therebetween, at least one of the engagement structures including a blade edge flanking the cable slot;

wherein the cable enclosure is configured to receive the cable such that the cable extends through the cable port and into the chamber and a portion of the cable is received in the cable slot such that the at least one blade edge cuts into the outer jacket to resist withdrawal of the cable from the chamber through the cable port, *wherein the strain relief structure is a strain relief member separately formed from and secured to the housing assembly and wherein the strain relief structure includes a base portion and has a passthrough axis along which the lengthwise axis of the cable extends when the cable is mounted in the cable slot; and the cable slot is generally U-shaped and includes an opening to receive the cable in a direction substantially perpendicular to the passthrough axis; wherein at least one of the engagement structures has a fixed end opposite and secured to the base portion and a blade edge opposite the fixed end, said at least one of the engagement structures tapering inwardly toward the passthrough axis in a direction away from the cable port and wherein the at least one of the engagement structures is radially outwardly deflectable with respect to the passthrough axis to accommodate a prescribed range of cable diameters.*

2. The cable enclosure of claim 1 wherein the cable slot has a nominal width that is less than an outer diameter of the outer jacket.

3. The cable enclosure of claim 1 wherein both of the engagement structures include a blade edge flanking the cable slot and, when the portion of the cable is received in the cable slot, both of the blade edges cut into the outer jacket to resist withdrawal of the cable from the chamber through the cable port.

[4. The cable enclosure of claim 1 wherein the strain relief structure is a strain relief member separately formed from and secured to the housing assembly.]

5. The cable enclosure of claim 1 wherein the strain relief structure is formed of metal.

6. The cable enclosure of claim 5 wherein the housing assembly is formed of a polymeric material.

[7. The cable enclosure of claim 1 wherein:

the strain relief structure includes a base portion and has a passthrough axis along which the lengthwise axis of the cable extends when the cable is mounted in the cable slot; and at least one of the engagement structures has a fixed end opposite and secured to the base portion and a blade edge opposite the fixed end, said at least one of the engagement structures tapering inwardly toward the passthrough axis in a direction away from the cable port.]

[8. The cable enclosure of claim 7 wherein the at least one of the engagement structures is radially outwardly deflectable with respect to the passthrough axis to accommodate a prescribed range of cable diameters.]

[9. The cable enclosure of claim 1 wherein:

the strain relief structure has a passthrough axis along which the lengthwise axis of the cable extends when the cable is mounted in the cable slot; and the cable slot is generally U-shaped and includes an opening to receive the cable in a direction substantially perpendicular to the passthrough axis.]

10. The cable enclosure of claim [9] *1* wherein the housing assembly includes a locator feature to limit radial displacement of the cable with respect to the passthrough axis.

11. The cable enclosure of claim 1 including a cable sealant to surround and provide an environmental seal about a portion of the cable when the cable is mounted in the housing assembly.

12. The cable enclosure of claim 1 wherein the cable includes an inner jacket interposed between the transmission media and the outer jacket, and the cable enclosure is configured to receive the cable such that the portion of the cable is received in the cable slot such that the at least one blade edge cuts into the outer jacket to resist withdrawal of the cable from the chamber through the cable port, but does not cut into the inner jacket.

13. [The cable enclosure of claim 1] *A cable enclosure for use with a cable having a lengthwise cable axis, an outer jacket and a transmission media within the outer jacket, the cable enclosure comprising:*

*a housing assembly defining a chamber and a cable port, wherein the housing assembly is configured to receive the cable; and*

*a strain relief structure on the housing assembly, the strain relief structure including a pair of opposed engagement*

*structures defining a cable slot therebetween, at least one of the engagement structures including a blade edge flanking the cable slot;*

*wherein the cable enclosure is configured to receive the cable such that the cable extends through the cable port and into the chamber and a portion of the cable is received in the cable slot such that the at least one blade edge cuts into the outer jacket to resist withdrawal of the cable from the chamber through the cable port, the cable enclosure* including the cable installed in the housing assembly and the strain relief structure, wherein the transmission media is an optical fiber*; wherein the cable includes an inner jacket interposed between the optical fiber and the outer jacket, and the at least one blade edge cuts into the outer jacket to resist withdrawal of the cable from the chamber through the cable port, but does not cut into the inner jacket; wherein the cable is a flat drop cable having, in cross-section, a width and a height greater than the width; wherein the cable includes a pair of strength members within the outer jacket and outside the inner jacket, the strength members being located at opposed ends of the height of the cable; and wherein the blade edges define a blade axis therebetween and the cable slot is configured such that the flat drop cable can only be inserted into the cable slot such that the blade axis extends through each of the strength members to prevent the engagement structures from cutting into the inner jacket*.

[14. The cable enclosure of claim 13 wherein the cable includes an inner jacket interposed between the optical fiber and the outer jacket, and the at least one blade edge cuts into the outer jacket to resist withdrawal of the cable from the chamber through the cable port, but does not cut into the inner jacket.]

[15. The cable enclosure of claim 14 wherein the cable is a flat drop cable having, in cross-section, a width and a height greater than the width.]

16. The cable enclosure of claim [15] *13* wherein the cable slot has a slot width that is less than the cable width.

[17. The cable enclosure of claim 15 wherein:

the cable includes a pair of strength members within the outer jacket and outside the inner jacket, the strength members being located at opposed ends of the height of the cable; and the blade edges define a blade axis therebetween and the cable slot is configured such that the flat drop cable can only be inserted into the cable slot such that the blade axis extends through each of the strength members to prevent the engagement structures from cutting into the inner jacket.]

18. The cable enclosure of claim 13 including a second optical fiber disposed in the housing assembly, and a splice operatively connecting the optical fiber of the cable and second optical fiber.

19. The cable enclosure of claim 1 including at least one strength member pocket wall on the housing assembly defining a strength member pocket, wherein the cable enclosure is configured to receive the cable such that the cable extends through the cable port, a transmission media of the cable extends into the chamber, and a terminal end of a strength member of the cable is contained in the strength member pocket to limit intrusion of the jacket and intrusion of the strength member into the housing assembly through the cable port.

20. A method for securing a cable in a cable enclosure, the cable having a lengthwise cable axis, [an outer] *a* jacket*, a strength member within the jacket,* and a transmission media within the [outer] jacket, the method comprising:

providing a cable enclosure including:

a housing assembly defining a chamber and a cable port, wherein the housing assembly is configured to receive the cable; and a strain relief structure *formed of metal* on the housing assembly, the strain relief structure including a pair of opposed engagement structures defining a cable slot therebetween, at least one of the engagement structures including a blade edge flanking the cable slot*, wherein the strain relief structure has a passthrough axis along which the lengthwise axis of the cable extends when the cable is mounted in the cable slot*; and installing the cable in the cable enclosure such that the cable extends through the cable port and into the chamber, including inserting a portion of the cable in the cable slot *in a direction substantially perpendicular to the passthrough axis* such that the at least one blade edge [cuts into the outer jacket to resist] *resists* withdrawal of the cable from the chamber through the cable port *and installing the cable in the cable enclosure such that the strength member extends beyond the strain relief structure and into a strength member pocket defined by the housing assembly, and wherein the strength member pocket includes an open end that receives the strength member into the pocket and a closed end that opposes a terminal end of the strength member*.

[21. A strain relief device for use with a flat drop cable having a cable width, a cable height greater than the cable width, a lengthwise cable axis, an outer jacket and a transmission media within the outer jacket, the strain relief device comprising:

a body; and strain relief structure on the body, the strain relief structure including a pair of opposed engagement structures defining a cable slot therebetween, at least one of the engagement structures including a blade edge flanking the cable slot;

wherein the strain relief structure is configured to receive the flat drop cable such that a portion of the flat drop cable is received in the cable slot such that at least one blade edge cuts into the outer jacket to resist withdrawal of the flat drop cable from the strain relief structure; and wherein the cable slot has a slot width that is less than the cable width.]

22. A method for securing a flat drop cable, the flat drop cable having a cable width, a cable height greater than the cable width, a lengthwise cable axis, an outer jacket and a transmission media within the outer jacket, the method comprising:

providing a strain relief device including:

a body; and a strain relief structure on the body, the strain relief structure including a pair of opposed engagement structures defining a cable slot therebetween, at least one of the engagement structures including a blade edge flanking the cable slot;

installing the flat drop cable in the strain relief structure, including inserting a portion of the flat drop cable in the cable slot such that at least one blade edge cuts into the outer jacket to resist withdrawal of the flat drop cable from the strain relief structure*; wherein the flat drop cable includes a strength member within the outer jacket, wherein the strength member extends beyond the strain relief structure and into a strength member pocket*

*defined by the body, and wherein the strength member pocket includes an open end that receives the strength member into the pocket and a closed end that opposes a terminal end of the strength member.*

[23. A cable enclosure for use with a cable having a lengthwise cable axis, an outer jacket and a transmission media and a strength member within the outer jacket, the outer jacket and the strength member each having a terminal end, the cable enclosure comprising:

a housing assembly defining a chamber and a cable port, wherein the housing assembly is configured to receive the cable; and at least one strength member pocket wall on the housing assembly defining a strength member pocket;

wherein the cable enclosure is configured to receive the cable such that the cable extends through the cable port, the transmission media extends into the chamber, and the terminal end of the strength member is contained in the strength member pocket to limit intrusion of the jacket and intrusion of the strength member into the housing assembly through the cable port.]

[24. A method for securing a cable in cable enclosure, the cable having a lengthwise cable axis, an outer jacket and a transmission media and a strength member within the outer jacket, the outer jacket and the strength member each having a terminal end, the method comprising:

providing a cable enclosure including:

a housing assembly defining a chamber and a cable port, wherein the housing assembly is configured to receive the cable; and at least one strength member pocket wall on the housing assembly defining a strength member pocket; and installing the cable in the cable enclosure such that the cable extends through the cable port, the transmission media extends into the chamber, and the terminal end of the strength member is contained in the strength member pocket to limit intrusion of the jacket and intrusion of the strength member into the housing assembly through the cable port.]

*25. The cable enclosure of claim 1 including the cable installed in the housing assembly and the strain relief structure, wherein the transmission media is an optical fiber.*

*26. The cable enclosure of claim 1 including at least one strength member pocket wall on the housing assembly defining a strength member pocket, wherein the cable enclosure is configured to receive the cable such that the cable extends through the cable port, a transmission media of the cable extends into the chamber, and a terminal end of a strength member of the cable is contained in the strength member pocket to limit intrusion of the jacket and intrusion of the strength member into the housing assembly through the cable port.*

*27. The cable enclosure of claim 1 wherein the at least one blade edge cuts only partially through a wall thickness of the outer jacket.*

*28. The method of claim 20, wherein the transmission media of the cable is an optical fiber.*

*29. The method of claim 22, wherein the transmission media of the flat drop cable is an optical fiber.*

*30. The method of claim 22, wherein the flat drop cable includes a first side defined generally along the cable width and a second side defined generally along the cable height, the second side being longer than the first side, the second side being generally parallel to the at least one blade edge when the flat drop cable is installed in the strain relief structure.*

*31. A strain relief device and cable combination comprising:*

*a metal clip defining a cable slot that defines a cable pass-through axis, the cable slot of the clip being defined at least in part by first and second spaced-apart edges of the clip, the edges being positioned on opposite sides of the cable pass-through axis, the cable slot having an open end for allowing a cable to be pressed between the edges into the cable slot in a direction substantially perpendicular to the cable pass-through axis; and*

*a fiber optic cable that has been pressed through the open end of the clip into the cable slot, the edges of the clip being embedded in a jacket of the cable to limit movement of the cable in an orientation along the cable pass-through axis, wherein the cable includes a strength member, wherein the strength member includes an unjacketed portion that extends beyond the clip, wherein an end portion of the unjacketed portion of the strength member is received within a pocket that opposes a terminal end of the unjacketed portion of the strength member.*

*32. The strain relief device and cable combination of claim 31, wherein the cable slot has a closed end opposite the open end.*

*33. The strain relief device and cable combination of claim 32, wherein the cable slot is generally U-shaped.*

*34. The strain relief device and cable combination of claim 31, wherein the fiber optic cable is a flat drop cable.*

*35. A telecommunications device for use with a cable having an outer jacket and a transmission media and a strength member within the outer jacket, the telecommunications device comprising:*

*a body;*

*a strain relief structure secured to the body, the strain relief structure configured to resist axial movement of the cable relative to the body once the cable has been installed in the strain relief structure; and*

*the body including a strength member blocking structure, the strength member blocking structure configured to oppose an exposed terminal end of the strength member of the cable; wherein the strain relief structure defines a cable slot that defines a cable pass-through axis, the cable slot of the strain relief structure being defined at least in part by first and second spaced-apart edges of the strain relief structure, the edges being positioned on opposite sides of the cable pass-through axis, the cable slot having an open end for allowing a cable to be pressed between the edges into the cable slot in a direction substantially perpendicular to the cable pass-through axis.*

*36. The cable device of claim 35, wherein the strength member blocking structure defines at least a portion of a strength member pocket having an open end for receiving the strength member of a cable retained by the strain relief structure.*

*37. The cable device of claim 35, wherein the cable slot has a closed end opposite the open end.*

*38. The cable device of claim 37, wherein the cable slot is generally U-shaped.*

*39. The cable device of claim 35, wherein the strain relief structure is formed of metal.*

*40. A method for providing strain relief to a cable, the cable having an outer jacket and a transmission media and a strength member within the outer jacket, the method comprising:*

*pressing the cable into a metal strain relief clip, wherein the cable is moved in a direction perpendicular to a longitudinal axis of the cable as the cable is pressed into the clip;*

*embedding edges of the clip into the cable outer jacket as the cable is pressed into the clip; and*

*inserting an unjacketed terminal end of the strength member in a pocket having a surface that opposes the terminal end.*

*41. The method of claim 40, wherein the transmission media is an optical fiber.*

*42. The method of claim 40, wherein the clip cuts only partially through a wall thickness of the outer jacket.*

*43. The method of claim 42, wherein the clip does not engage the strength member.*

*44. The method of claim 40, wherein the cable is a flat fiber optic drop cable.*

*45. The method of claim 44, wherein the drop cable has an elongate transverse cross-sectional profile with long sides and short sides and wherein the edges embed in the long sides.*

* * * * *